(12) United States Patent
Scully

(10) Patent No.: US 9,759,528 B2
(45) Date of Patent: Sep. 12, 2017

(54) SMOKE GENERATOR AND METHOD OF CONTROLLING A SMOKE GENERATION

(71) Applicant: MARTIN PROFESSIONAL ApS, Aarhus N (DK)

(72) Inventor: Nicholas John Scully, Louth (GB)

(73) Assignee: MARTIN PROFESSIONAL APS, Arhus N (DK)

( * ) Notice: Subject to any disclaimer, the term of this patent is extended or adjusted under 35 U.S.C. 154(b) by 209 days.

(21) Appl. No.: 14/326,607

(22) Filed: Jul. 9, 2014

(65) Prior Publication Data

US 2015/0014430 A1 Jan. 15, 2015

(30) Foreign Application Priority Data

Jul. 12, 2013 (EP) ..................................... 13176307

(51) Int. Cl.
| | |
|---|---|
| *F41H 9/00* | (2006.01) |
| *F41H 9/08* | (2006.01) |
| *A63J 5/02* | (2006.01) |
| *G05D 11/13* | (2006.01) |
| *B05B 7/16* | (2006.01) |
| *B05B 12/08* | (2006.01) |

(Continued)

(52) U.S. Cl.
CPC ................ *F41H 9/08* (2013.01); *A63J 5/025* (2013.01); *B05B 7/1606* (2013.01); *B05B 7/1686* (2013.01); *B05B 12/087* (2013.01); *F41H 9/06* (2013.01); *G05D 11/138* (2013.01); *A23B 4/0526* (2013.01)

(58) Field of Classification Search
CPC .. F41H 9/06; F41H 9/08; A23B 4/0526; A63J 5/025

USPC ..... 239/136, 137; 222/52, 63, 333; 392/394, 392/399, 402; 417/44.1, 44.11
See application file for complete search history.

(56) References Cited

U.S. PATENT DOCUMENTS 2,070,038 A * 2/1937 Batt ........................ A63J 5/025
202/185.2
4,262,686 A 4/1981 Heim et al.
(Continued)

FOREIGN PATENT DOCUMENTS

WO 2009/151375 A1 12/2009

OTHER PUBLICATIONS

Extended European Search Report, EP Application No. 13176307.0, dated Dec. 12, 2013, 6 pages.

*Primary Examiner* — Alexander Valvis
(74) *Attorney, Agent, or Firm* — Artegis Law Group, LLP

(57) ABSTRACT

The invention relates to a method of controlling a smoke generator. The smoke generator is adapted to be connected to a supply of a pressurized gas and a supply of a smoke liquid and further comprises a valve to regulate the pressure of the gas, a fluid driving means, a mixing unit for mixing the smoke liquid and the gas, and a heat exchanger heating the mixture of the pressurized gas and the smoke liquid to vaporize the smoke liquid and form a smoke upon ejection into surrounding air. The control method according to the invention then comprises the steps of receiving a smoke density parameter indicative of a desired amount of smoke to be generated by the smoke generator, measuring a gas pressure at a position between the valve and the heat exchanger, and using these parameters in controlling the valve.
The invention further relates to a smoke generator arranged for performing the control method.

10 Claims, 6 Drawing Sheets

(51) Int. Cl.
*F41H 9/06* (2006.01)
*A23B 4/052* (2006.01)

(56) References Cited

U.S. PATENT DOCUMENTS

| | | | | |
|---|---|---|---|---|
| 4,558,196 A | * | 12/1985 | Babasade | A23B 4/0526 |
| | | | | 219/629 |
| 5,367,603 A | * | 11/1994 | Wenrich | B05B 7/1626 |
| | | | | 392/394 |
| 6,477,890 B1 | * | 11/2002 | Hulsebus | F41H 9/06 |
| | | | | 239/136 |
| RE38,686 E | * | 1/2005 | Loblick | F22B 29/06 |
| | | | | 261/142 |
| 7,529,472 B2 | * | 5/2009 | Lazzarini | F41H 9/06 |
| | | | | 392/387 |
| 7,578,225 B2 | * | 8/2009 | Bosch | A62C 99/0081 |
| | | | | 114/15 |
| 7,872,585 B2 | * | 1/2011 | Scully | F41H 9/04 |
| | | | | 340/541 |
| 2011/0121092 A1 | | 5/2011 | Scully | |

* cited by examiner

SMOKE GENERATOR AND METHOD OF CONTROLLING A SMOKE GENERATION

FIELD OF THE INVENTION

The present invention relates to a method of controlling a smoke generator wherein the smoke generator drives a mixture of a smoke liquid and a pressurized gas into a heat exchanger to vaporize the smoke liquid and form a smoke upon ejection into surrounding air. The invention further relates to a smoke generator adapted for performing the control method.

BACKGROUND

Smoke and fog generators are used in a variety of applications such as in security applications, for simulating fire as a training aid, or in entertainment, e.g. for creating special effects or lighting effects on stage. In the entertainment the smoke or haze created by smoke generators are especially important for the smoke effect but also essential in creating lighting and lighting effects, where some lightings effects like mid-air light beam effects only become visible when used together with a fine diffused haze.

A smoke generator in general works by a smoke liquid being driven into a heat exchanger to vaporize. When ejected into the ambient, the vaporized smoke liquid condensate and forms a smoke. Different types of smoke or fog generators exist capable of creating everything from a thick heavy smoke or fog to the finest barely visible haze.

Here and in the following the term 'smoke' and 'smoke generators' will be used in general to describe both smoke, fog and haze, and a generator for creating a smoke, fog, or haze effect. Likewise, the term 'smoke liquid' is here and in the following used as a general term for a liquid, which after vaporization and subsequent condensation to micro droplets forms a smoke.

The quality or characteristics of the generated smoke depends in particular on the type of smoke liquid used, which then yields different requirements to the temperatures needed to vaporize the liquid, to the applicable heat exchanger design, and to the means for ensuring a sufficient smoke liquid flow into the heat exchanger.

Different types of smoke generators exist with different means for driving the smoke liquid into the heat exchanger, such as a simple air pump, or mixing the smoke liquid with a compressed or pressurized gas, or pressurizing the smoke liquid itself. It is important to drive the smoke liquid continuously into the heat exchanger under sufficient high pressure to ensure a complete vaporization and to create the liquid flow necessary to create the desired amount of smoke.

It is known to use a constant externally applied pressure from a gas cylinder, which upon connection to the system is throttled down through e.g. a metering orifice to provide the desired flow to the heat exchanger. In most applications, the gas flow is manually controlled to allow some variation in output. However, such generators often encounter problems of variations in output, as the pressure in the gas cylinder reduces.

Also, the flow through the heat exchanger can be seen to be unsteady due to the backpressure created by the vaporisation process of the smoke liquid. This leads to variability in the flow through the unit which is then perceived as variability in the output making the resulting haze uneven, and reducing the quality of the effect when seen with normal stage lighting. The problem of uneven smoke generation is seen to increase with increased smoke liquid delivery, i.e. with more dense smoke generation. The problem may to some extent be alleviated by using a gas supply of sufficiently high pressure at all times which however is economically and environmentally undesirable. Such a system is disclosed in WO 2009/151375 where a supply of nitrogen containing gas is fed at a constant high pressure of at least 6 bar (87 psi) to the smoke generating section as set by a manually or electrically controlled pressure regulator.

Existing smoke generators where the gas is normally delivered at a relatively high pressure are further seen to have problems of blockages in the heat exchangers, which may occur if the desired smoke output is reduced to very low levels. To avoid such blockages, the controls of the machines are often programmed not to allow smoke outputs below a certain level reducing the performance possibilities of the machine correspondingly.

DESCRIPTION OF THE INVENTION

It is an object of embodiments of the invention to provide a method of controlling a smoke generator avoiding some of the above mentioned problems such as to provide a more even smoke output of the generator.

A further object is to provide a smoke generator which can operate with a reduced gas and energy consumption, and which is more environmentally friendly.

A further object is to provide a method of controlling a smoke generator capable of producing a stable and controllable smoke with a desired force and density or volume for all levels of smoke generation.

A further object is to provide a method of controlling a smoke generator providing enhanced safety and control of the pressure level of the supplied gas.

In accordance with the invention this is obtained by a method of controlling a smoke generator wherein the smoke generator is adapted to be connected to a supply of a pressurized gas and a supply of a smoke liquid and wherein the generator comprises a valve to regulate the pressure of the gas, a fluid driving means to regulate the flow of the smoke liquid, a mixing unit arranged to mix the smoke liquid and the pressurized gas, and a heat exchanger to heat the mixture of the pressurized gas and the smoke liquid to vaporize the smoke liquid and form a smoke upon ejection into surrounding air. The method according to the invention comprises the steps of receiving a smoke density parameter indicative of a desired amount of smoke to be generated by the smoke generator, regulating the flow of the smoke liquid as a function of the smoke density parameter, measuring a gas pressure at a position between the valve and the heat exchanger, and controlling the valve as a function of the smoke density parameter and the measured gas pressure.

Generally speaking and traditionally, during operation a smoke from a smoke generator can be modified in two different ways separately or at the same time: by adjusting the airflow or outflow of the smoke and by adjusting the amount or the density of the smoke. The airflow is typically adjusted and controlled by adjusting a fan at the exit of the generator blowing the smoke out of the generator, whereas the amount of smoke to be generated is changed by reducing or increasing the amount of smoke liquid sent through the heat exchanger and vaporized.

By the invention above is obtained that the gas pressure is regulated and controlled as a function of the smoke density parameter. Hereby is obtained a gas pressure at the entry of the heat exchanger corresponding to the desired amount of smoke and thereby to the flow of smoke liquid being driven to the heat exchanger. At the same time by controlling the valve as a function of the gas pressure measured at a position between the valve and the heat exchanger is obtained a feedback control loop whereby may be obtained a desired target pressure at all times for any flow of smoke liquid being driven to the heat exchanger and for a gas supply at any pressure. Hereby is further obviated the problem of existing systems of back pressure in the heat exchanger causing the liquid flow through the heat exchanger to fluctuate and the smoke generation to be uneven or in some situation even causing a blockage of the heat exchanger. The control method according to the above thereby advantageously provides a smoothness of the smoke output of the generator and a more even and steady smoke generation. This greatly affects and improves the light effects which can be realized when smoke generators are used to make the light visible.

As mentioned, the fluid vaporisation of the smoke liquid in the heat exchanger has a significant effect on the change of the pressure at the entry to the heat exchanger. The fluid vaporisation and process of boiling the smoke liquid off may cause a pressure change in the order of 1 psi or even as high as around 3 psi for some types of heat exchangers and types of gasses, Especially for a system of relatively low driving pressure below 10 psi such as in the range of 3-5 psi, this then yields a corresponding very high relative pressure change, in some cases as high as around 20% of the working pressure. Without the disclosed control method of pressure regulation such significant pressure variation would cause a correspondingly irregular liquid flow into the heat exchanger and thereby a noticeably uneven and unsmooth smoke output. On the other hand, the control method according to the invention where the valve is regulated and controlled based on the measured gas pressure overcomes these drawbacks and provides a smoke generation system with an even and smooth smoke output regardless of the required driving pressure, the type of heat exchanger, the gas type, potential instabilities in the smoke liquid flow, and for the desired smoke density.

The control method according to the invention further acts to automatically reduce the gas consumption especially at low smoke outputs where the smoke liquid flow is lower and the required pressure therefore correspondingly lower. Hereby, the overall consumable cost may be lowered correspondingly. Experiments have shown that for lower smoke outputs the gas consumption can be reduced down to one third or less the normal consumption without the use of the control method. The reduced gas consumption also makes the smoke generator with the proposed control method more environmentally friendly.

As the gas pressure is controlled as a function of the measured gas pressure is furthermore obtained the desired target pressure is obtained automatically independent of any reduction or irregularities in the pressure of supplied gas as may for example occur when the volume in a gas cylinder is reduced.

Measuring the pressure as an independent value which can then be used within the control system also allows for the detection of gas pressure loss (for example an empty gas cylinder). This may be achieved by timing the duration of any periods where the control loop is not locked. A gas pressure loss will then cause the valve control output to be driven to its saturation value, thus indicating a loss of pressure at the gas supply.

Also, the desired target pressure is realized irrespective if a gas valve on the gas supply is correctly set by user, which is otherwise a common problem causing the smoke generator to function non-optimally.

The smoke generator is adapted to be connected to a supply of a pressurized gas, which may be any gas compatible with the type of smoke liquid. This may for example be a gas supplied from a gas cylinder, from a simple air pump, or from a gas generator such as a Nitrogen generator using selective adsorption. The pressurized gas may for example be air, Argon, Nitrogen, $CO_2$, other inert gasses, or combinations hereof.

The gas is pressurized such as to aid in driving the smoke liquid to and through the heat exchanger. The pressure of the gas may be initially throttled down upon entry to the smoke generator to adjust the pressure level from the gas source to the pressure level applicable by the smoke generator. Such initial gas pressure regulation may be manually operated.

The valve is controlled to obtain a desired target pressure. The target pressure in general depends on different parameters such as the type of the smoke liquid, the type and design of the heat exchanger and the temperatures at which it is operated and as required to vaporize the smoke liquid. Some types of heat exchangers require a higher level of pressure to drive the smoke liquid through the heat exchanger. Most importantly, the desired target pressure depends on the smoke liquid flow in that a higher pressure at the entry of the heat exchanger is required to ensure a higher flow and a steady constant flow through the heat exchanger. This dependence is reflected in the pressure valve being controlled as a function of a received smoke density parameter indicative of a desired amount of smoke to be generated by the smoke generator. If the desired amount of smoke is increased, the smoke liquid flow and the desired target pressure are increased correspondingly. Therefore the pressure valve is advantageously controlled as a function of the received smoke density parameter.

The smoke liquid may be oil based or water based, such as for example a water based glycerine or a glycol.

The fluid driving means to regulate the flow of the smoke liquid may comprise a pump of some type such as an air or liquid pump, diaphragm pump, piston pump, or a dosage pump. The fluid driving means may alternatively comprise a gas pressurizing the liquid.

The valve for regulating the pressure of the gas may advantageously be a proportional valve such as for example an Emerson proportional valve, a disk valve, or a solenoid valve. In an embodiment the control of the valve is provided completely or in part by the electronics in the smoke generator. The control signals controlling the valve can be based on any kind of signals, for instance PWM, DC signals, Frequency and/or amplitude modulated AC signals or digital signals.

The mixing unit arranged to mix the smoke liquid and the pressurized gas may simply comprise a T-branch connection or a mixing chamber. The mixing of the smoke liquid and the gas may be performed after or before the valve regulating the pressure. If the mixing unit is placed after the valve such that the gas and the smoke liquid is mixed after the gas pressure has been regulated is obtained that the requirements to the pressure capability of the fluid driving means are less high.

The heat exchanger may comprise any heating exchanger for heating a fluid-gas mixture as known in the art. In one embodiment, the heat exchanger is a cartridge heater. The heating exchanger may in one embodiment comprise a heating element placed in thermal contact with a closed fluid conduit such as a heating block with a heating element placed in a heat storage. The control method according to the invention is further advantageous in making it possible to operate and control the smoke generator at relatively low pressures. This opens up for the possibility to use different types of heat exchangers which may have a lower risk of blockage beside the clear advantage of reducing the gas usage.

If the type of heat exchanger used displays a very low back pressure when gas flows through, only a relatively low flow rate and driving pressure is required to give the smoke liquid sufficient propulsion through the heat exchanger. As mentioned above, this has the result that the gas consumption can be reduced considerably when compared to smoke generators using e.g. conventional tube based heat exchangers which rely on pressure as high as 60 psi or higher to force the working fog fluid through the unit.

The smoke density parameter is a parameter indicative of a desired amount of smoke to be generated by the smoke generator and may be communicated as input to the control unit based on an external communication signal e.g., based on a DMX 512, Art-Net or RDM protocols as known for entertainment lighting. However any communication protocols/means can be uses such as Ethernet based protocols, DMX protocol, or the like, or may additionally or alternatively be based on a pre-programmed pattern stored in the control unit.

The gas pressure is measured by a pressure sensor placed at a position between the valve and the heat exchanger. The pressure sensor may comprise a capillary tube to restrict the flow to the sensor. The pressure sensor may use piezo-resistive elements to decrease the response time of the sensor and increase the performance of the control method. The pressure sensor may comprise a diaphragm type sensor, a capacitive sensor, and/or a MEMS device.

The pressure sensor may advantageously be placed as close to the heat exchanger as possible thereby obtaining a better control of the pressure at the entry of the heat exchanger. The pressure sensor may in an embodiment be placed in the conduit before the gas is mixed with the smoke liquid. Hereby more low cost sensors with limitations on temperature and moisture can be used.

The position of the pressure sensor before or after the mixing with liquid and its distance to the entrance of the heat exchanger further affects the desired target pressure to be obtained by the regulation of the valve according to the control method of the invention. This on the other hand means that a smoke generator can perform equally well for different locations of a pressure sensor only by adjusting how the valve is regulated as a function of the measured pressure accordingly.

The regulation of the smoke liquid flow and the regulation of the pressure valve may be performed by the same or by different control unit.

In an embodiment of the invention the step of controlling the valve is performed as a PI or a PID control. The control of the valve may be implemented as a closed loop control for example by a standard PI or PID control algorithm. In an embodiment a simple PI control may be adequate for the precision required in the system. Compensation may in one embodiment be provided by making a dominant pole at a frequency at least a decade below any others in the system. By a PI or PID control may be obtained a simple yet effective, fast, and robust control and regulation of the pressure valve. The valve is hereby controlled to continuously obtain a desired target pressure value and which is set in dependence of the desired amount of smoke and therefore set to fit the expected smoke liquid flow. Direct control of the output with very high resolution (1% increments) is hereby achievable and repeatable. By the application of a PID control is obtained a significantly better rejection or suppression of variations in the resulting gas pressure with only minor additional computational overhead.

In an embodiment the pressure is measured before the mixing with smoke liquid. In a further embodiment, the step of measuring the gas pressure comprises measuring the pressure after the liquid is mixed with the gas. Hereby may be used a pressure sensor without a need for restricting the flow to the sensor, which may help to reduce the response time of the sensor improving the performance of the control system.

According to further embodiment of the invention, the method further comprises determining a flow of the smoke liquid and regulating the flow of the smoke liquid as a function of the smoke density parameter and the smoke liquid flow. Hereby is obtained that the flow of the smoke liquid is regulated not only according to the smoke density parameter, but also according the actual flow of the smoke liquid. Hereby may be obtained a more precise regulation of the smoke liquid and accordingly of the amount of generated smoke.

In yet a further embodiment, the method further comprises determining a flow of the smoke liquid and controlling the valve as a function of the smoke density parameter, the smoke liquid flow and the measured gas pressure. Hereby is ensured that the valve and thereby the pressure is adjusted according to the actual flow of smoke liquid in the generator. In this way is obtained a more precise control as the smoke liquid flow is not merely assumed correctly adjusted according to the smoke density parameter. Also, the method then ensures a precise valve setting and thereby pressure irrespective of any imprecise or fluctuating regulation of the smoke liquid flow. Further, this is advantageous in the method then can detect if the smoke liquid flow is unexpectedly high or low or interrupted, and control the generator accordingly for example by emitting an error signal, ensuring the generator is purged or shut down. Hereby the safety of the system and the smoke generator is greatly increased. Such irregular or unexpected smoke liquid could be caused by for example a malfunction of a part of the smoke generator, an unexpected stop of the fluid driving means or simply because the smoke liquid is supply is emptying. By the purging is ensured that any progressive build-up of polymerized glycol in the smoke generator can be avoided. The shutdown process would thus prevent further damage of the smoke generator upon malfunctioning of one part of the system, reducing any service expenses, and limiting the damage to the machine.

In an embodiment, the smoke liquid flow is determined by means of a flow sensor. The flow sensor may be positioned anywhere between the fluid supply and the mixing unit.

In an embodiment the fluid driving means comprises a dosage pump and the smoke liquid flow is determined from the operating of the dosage pump. Hereby the liquid flow can be simply determined without the need of a flow sensor as the liquid flow is given by the number of pulses applied to the drive circuits of the dosage pump within a given time. The control method according to the invention is specifically advantageous if the smoke liquid is delivered in pulses for example by a dosing pump. In traditional systems such pulsed liquid delivery would cause the pressure to vary in synchronism, which can be very noticeable when running the smoke generator especially at small flows. However, the pressure regulation and control method according to the invention advantageously suppresses or significantly reduces such pressure variations caused by irregularities in the fluid flow, resulting in an even smoke output.

In an embodiment the method further comprises determining a temperature of the heat exchanger and controlling the valve as a function of the temperature of the heat exchanger. Hereby is obtained that the valve and thereby the pressure is adjusted to yield optimal values corresponding to the actual temperature of the heat exchanger such that the desired vaporisation in the heat exchanger can be realized. Hereby the control unit may also advantageously detect any malfunction of the heat exchanger and control the valve and the optionally the smoke liquid supply accordingly. In this way the control unit may for example initiate purging of the heat exchanger and/or shut the generator down in the event of an unexpected temperature of the heat exchanger.

In an embodiment of the invention, the method further comprises receiving information on the type of the smoke liquid and controlling the valve as a function of the smoke liquid type. This allows the smoke generator to be able to operate with different types of smoke liquid as the settings for the valve and thereby for the target pressure at the entry to the heat exchanger can be simply adjusted accordingly and based on the received information. Hereby the problems of the user using a different smoke liquid than intended otherwise leading to less optimal smoke generation may be obviated or reduced. In an embodiment the user may be given the possibility to choose between the different types of smoke liquid and indicate the choice to the generator which will then operate correspondingly.

In an embodiment of the invention, the control is performed by means of a look-up table comprising values of target gas pressure for a number of smoke density parameters. Hereby the control may perform a closed loop operation continuously regulating the valve to obtain the target pressure value as given by the look-up table. As also mentioned previously the target pressure may in addition to depend on the smoke density parameter depend on parameters such as the type of the smoke liquid, the position of the pressure sensor, the smoke liquid flow, the temperature of the heat exchanger, the fan settings, and/or the humidity and temperature of the surroundings.

In an embodiment of the invention, the valve is controlled to yield a measured gas pressure in the range of 1-10 psi, such as in the range of 2-8 psi, such as in the range of 3-5 psi. The advantages of the control method mentioned in the above are especially pronounced for smoke generation systems of lower gas pressure levels in the order of below 10 psi or lower. For such systems, the vaporization of the smoke liquid in the heat exchanger causes significant pressure changes at the entry to the heat exchanger as the liquid boils off in the order of 1-3 psi, which especially compared to the low driving pressure is very large. Such large pressure variations result in corresponding substantial instability in the gas flow and thus the effect exiting the smoke generator causing visually very pronounced and noticeable variations and unevenness in the smoke output. Such instabilities in the liquid flow are removed or at least significantly reduced by the control method according to the invention where the valve is controlled as a function of the measured gas pressure.

In an embodiment of the invention, the valve is controlled such that a variation of the gas pressure is lower than an upper limit for an approximately constant smoke liquid flow and a constant smoke density parameter. Hereby is obtained an effective control of the smoke generator with even smoke output regardless of any potential irregularities of liquid flow and for all types of heat exchangers and all levels of gas supply. According to a further aspect the invention relates to a smoke generator adapted to be connected to a supply of a pressurized gas and a supply of a smoke liquid. The generator comprises a valve arranged to regulate the pressure of the gas, a fluid driving means to regulate the flow of the smoke liquid, a mixing unit arranged to mix the smoke liquid and the gas, a heat exchanger arranged to heat the mixture of smoke liquid and the gas to vaporize the smoke liquid and form a smoke upon ejection into surrounding air. The generator further comprises a pressure sensor arranged to measure the gas pressure at a position between the valve and the heat exchanger, and a control unit adapted to receive a smoke density parameter indicative of a desired amount of smoke to be generated by the smoke generator. The control unit is further adapted to regulate the flow of the smoke liquid as a function of the smoke density parameter, and to control the valve based on the smoke density parameter and the measured gas pressure. The advantages hereof are as discussed in relation to the first aspect of the invention of a method of controlling a smoke generator.

BRIEF DESCRIPTION OF THE DRAWINGS

In the following different embodiments of the invention will be described with reference to the drawings, wherein.

DETAILED DESCRIPTION OF THE DRAWINGS

Figure 1:
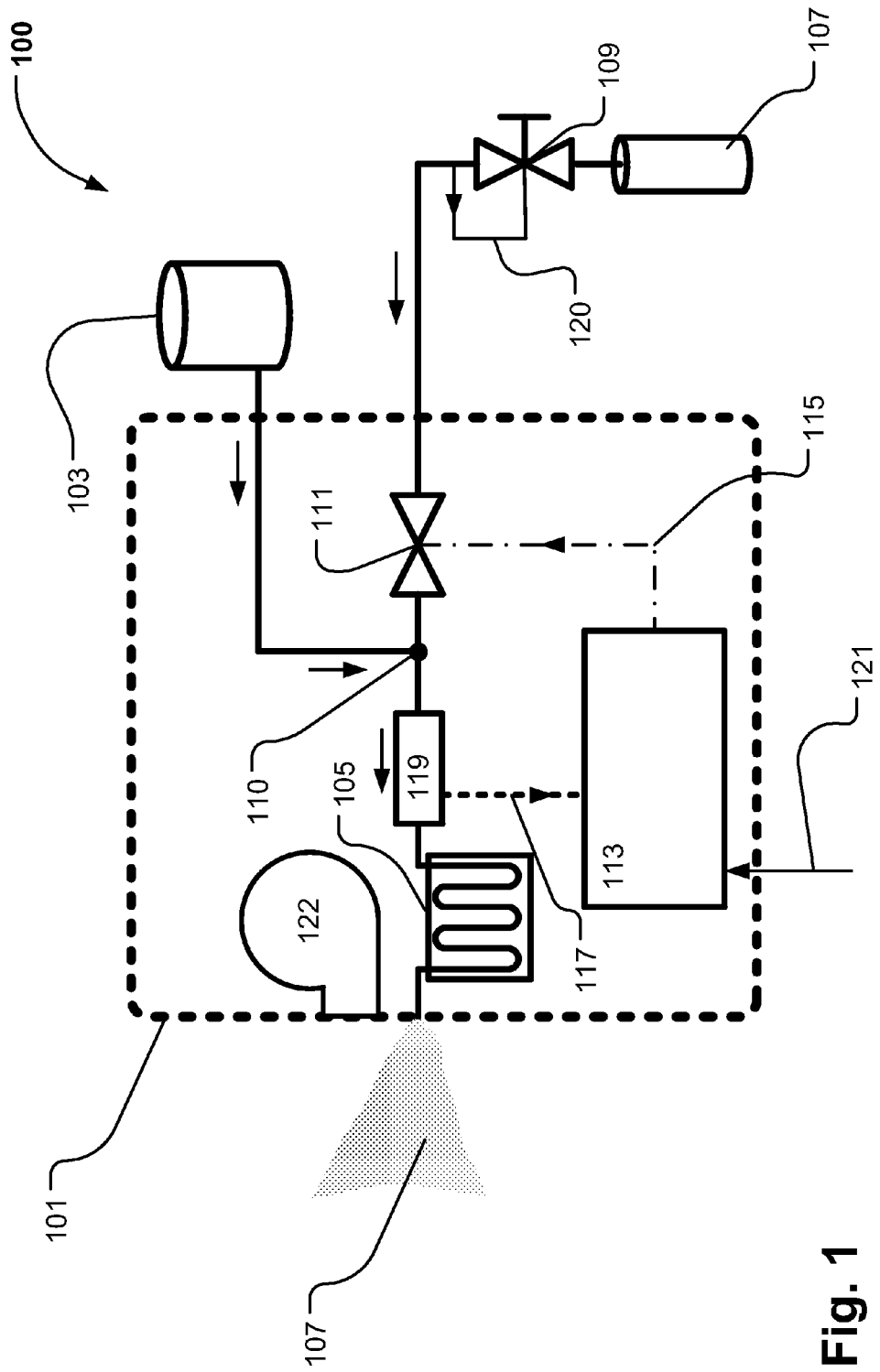
FIG. 1 illustrates a smoke generator comprising a control unit for controlling the generator according to one embodiment of the invention.

FIG. 1 illustrates a smoke generating system 100 comprising a smoke generator 101 according to an embodiment of the invention connected to a supply of smoke liquid 103 and a supply of a pressurized gas 107. In one embodiment, the gas pressure is throttled down by means of a valve 109, which may be manually operated. This valve may be omitted. This valve 109 may further comprise an internal F/B indicating regulator, 120, for enhanced safety and control of the pressure level of the supplied gas.

The flow of the smoke liquid and the pressurized gas is indicated by the arrows.

The smoke liquid 103 is driven to a mixing unit 110 where it is mixed with the gas. The mixture is guided into a heat exchanger 105 causing the smoke liquid to vaporize and to form a smoke 107 upon contact with the surrounding air when exiting the smoke generator 101. The smoke generator may further comprise a fan (122) at the smoke exit which can be controlled to regulate the airflow from the generator with the smoke. The fan may be omitted. A valve 111 regulates the pressure of the gas 107 before being mixed with the smoke liquid 103. The valve 111 for regulating the pressure may in another embodiment be placed after the mixing of the smoke liquid and the gas.

A pressure sensor 119 is placed in the conduit after the valve 111 detecting the pressure of the gas or of the liquid-gas mixture. The pressure sensor may be placed in the conduit before the mixing unit, i.e. before the mixing of the gas and the smoke liquid. Alternatively, the pressure sensor may be placed in the conduit after the mixing unit after the mixture of the gas and the smoke liquid. The pressure sensor may for example be a resistive pressure sensor, optionally with a capillary tube to restrict the flow to the sensor.

The smoke generator further comprises a control unit 113 connected 115 to the valve 111 and configured to control the valve 111 and thereby regulate the gas pressure. The control unit may for example comprise a microcontroller, a computer, a microprocessor, printed circuit board or the like.

Whereas the airflow of the generated smoke is primarily controlled by adjusting the setting of the fan placed at the exit of the smoke generator, the smoke density or amount of smoke to be generated by the smoke generator (i.e. how 'heavy' or thick the smoke is) is primarily controlled by adjusting the amount of smoke liquid supplied to the heat exchanger. This in turn set requirements to the pressure at the entrance to the heat exchanger to ensure the desired continuous flow of smoke liquid through the heat exchanger. The desired amount of smoke to be generated may be based on input 121 from a user and/or based on pre-programmed data.

According to the invention the smoke generator is controlled to set and obtain a certain target pressure to ensure the necessary and sufficient pressure at the entrance to the heat exchanger corresponding to the desired density parameter and thereby to the amount of smoke liquid being used.

This is obtained by the pressure sensor 119 interfacing 117 with the control unit 113, which utilises the pressure as feedback in a closed loop control process for controlling the valve 111. The desired target pressure is determined as a function on the desired amount of smoke to be generated. The actual values may be read from an indexed look-up table within the machine control program. In this way the target pressure at the entrance to the heat exchanger is obtained and kept regardless of the amount of smoke liquid delivered, regardless of the gas pressure supplied to the smoke generator, and completely or at least to some extent irrespective of any fluctuations in the smoke liquid delivery. Also variations in the pressure at the heat exchanger entrance otherwise caused by back pressure in the heat exchanger can be reduced or even avoided.

The input 121 on the desired amount of smoke may be based on an external communication signal e.g., based on a DMX protocol, or the like, or may additionally or alternatively be based on a pre-programmed pattern stored in the control unit.

The control of the valve 111 may be implemented as a standard PI or PID control algorithm. The PI or PID controller calculates an "error" value as the difference between the measured pressure and the desired target pressure or set-point and minimizes the error by the adjustment or regulation of the valve 111.

The valve 111 is preferably a proportional valve such as an Emerson Proportional Valve. The PWM control voltage of the valve may be provided directly by the electronics in the smoke generator.

The pressure changes caused by the fluid entering the heat exchanger can additionally be used to detect the loss of liquid supply and to initiate a shutdown of the machine. The pressure sensor may also be used to detect gas pressure failure, which can then be reported over for example a RDM communication protocol from an integrated DMX controller. However any other communication protocol or communication means can be used.

The controller may be adapted to start a shut-down process of the smoke generator in case of malfunctioning of some part of the system, e.g. an interruption of the external power supply, the delivery of smoke liquid or failure or malfunction of the liquid system or pumps or other components. The controller may then deactivate the liquid supply and optionally activate a purging system such as an air pump to purge the heat exchanger and/or the fluid pump. This prevents progressive build-up of polymerized glycol in the heat exchanger which may otherwise result in premature failure of the system.

Figure 2:
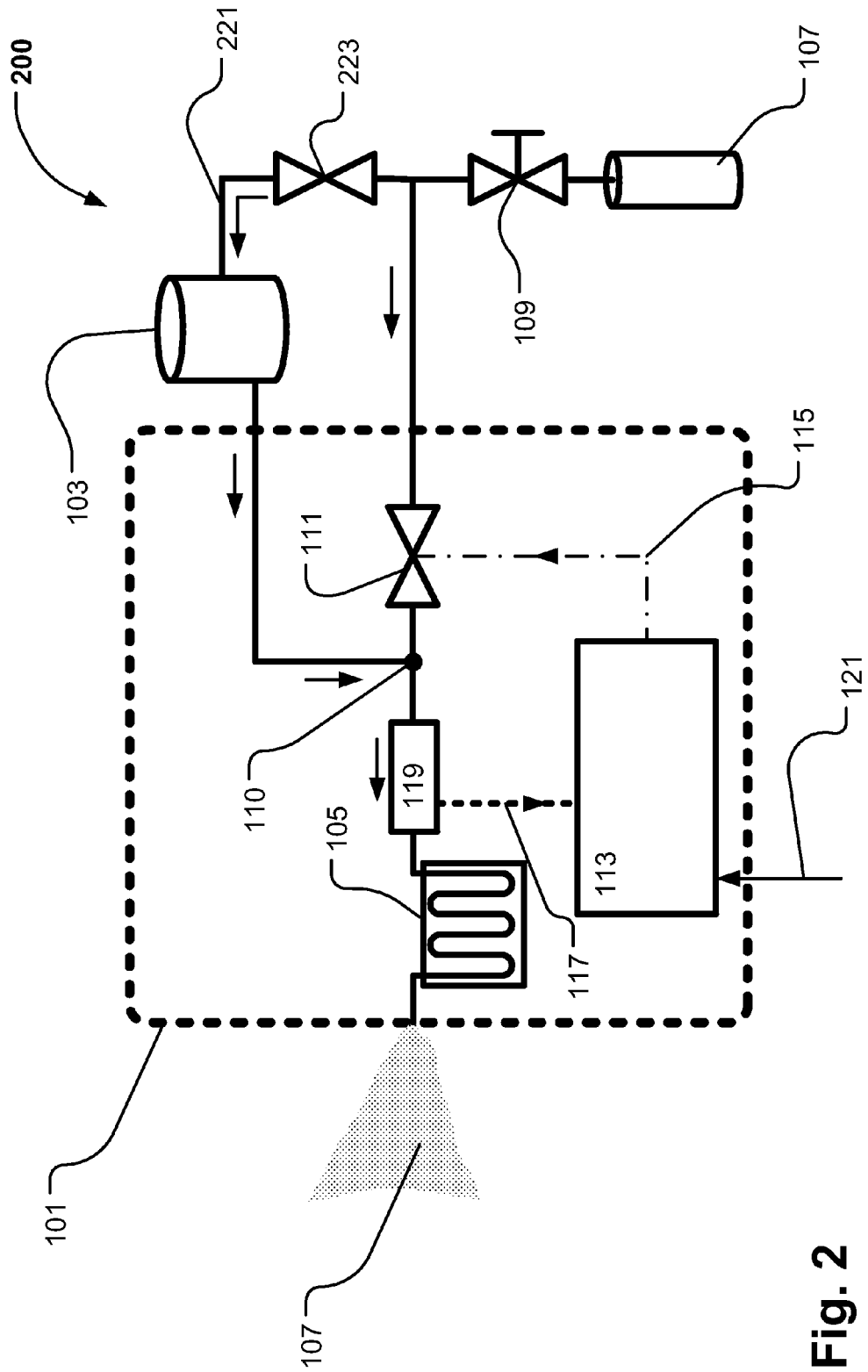
FIG. 2-4 show different embodiments of a smoke generator according to the invention.

In the smoke generating system 200 shown in FIG. 2, the pressurized gas 107 is used as driving means of the smoke liquid 103 for regulating the flow of the smoke liquid. The pressurized gas 107 is guided 221 directly to the container of the smoke liquid 103 optionally through a valve 223 for regulating the gas pressure.

Figure 3:
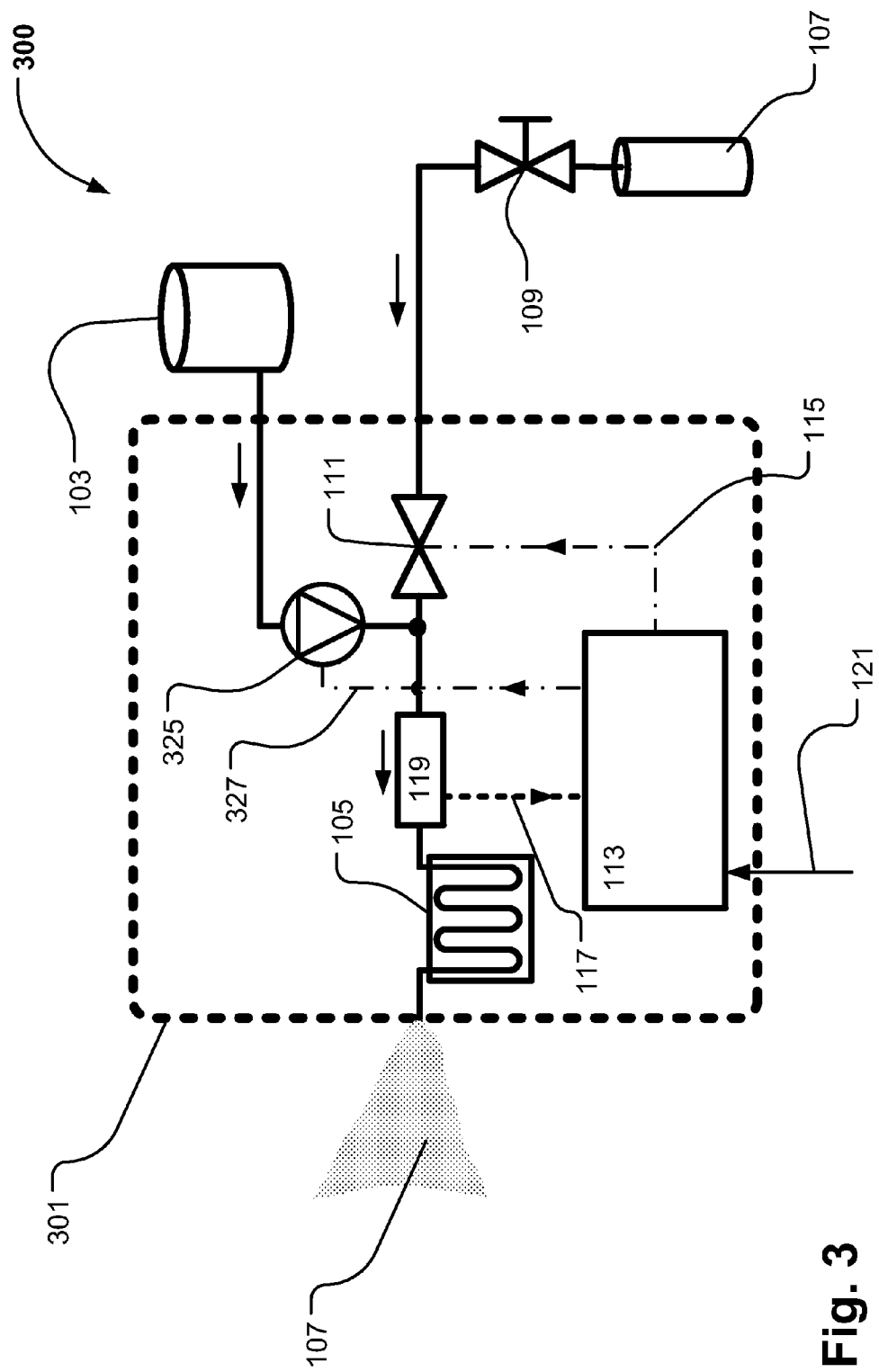

As shown in FIG. 3, the smoke generator 301 may in an embodiment comprise a fluid pump 325 positioned to regulate the flow of the smoke liquid. The fluid pump may for example be a dosage pump or a fluid pump. The fluid pump may be controlled 327 by the control unit 113 or by another control unit. The fluid pump is preferably controlled in accordance with the input 121 on the desired amount of smoke to be generated.

Figure 4:
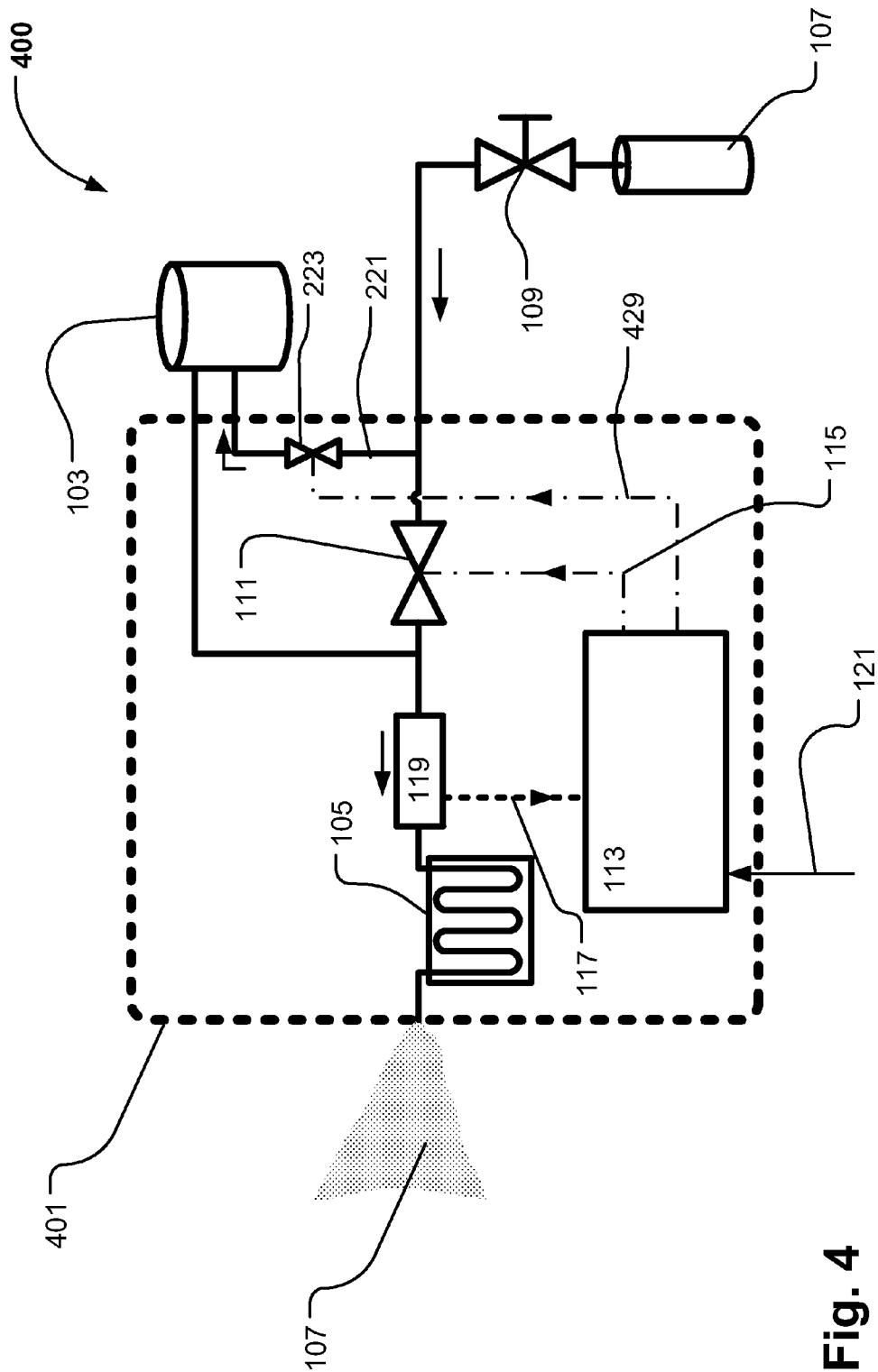

The embodiment of the smoke generating system 400 shown in FIG. 4 corresponds to the smoke generating system 200 of FIG. 2, only here the conduits 221 and the optional valve 223 is positioned inside the smoke generator 400. Hereby the smoke generator 400 is prepared to be connected to a supply of pressurized gas only in one place. Also, the valve 223 may then be controlled 429 by the control unit 113.

Figure 5:
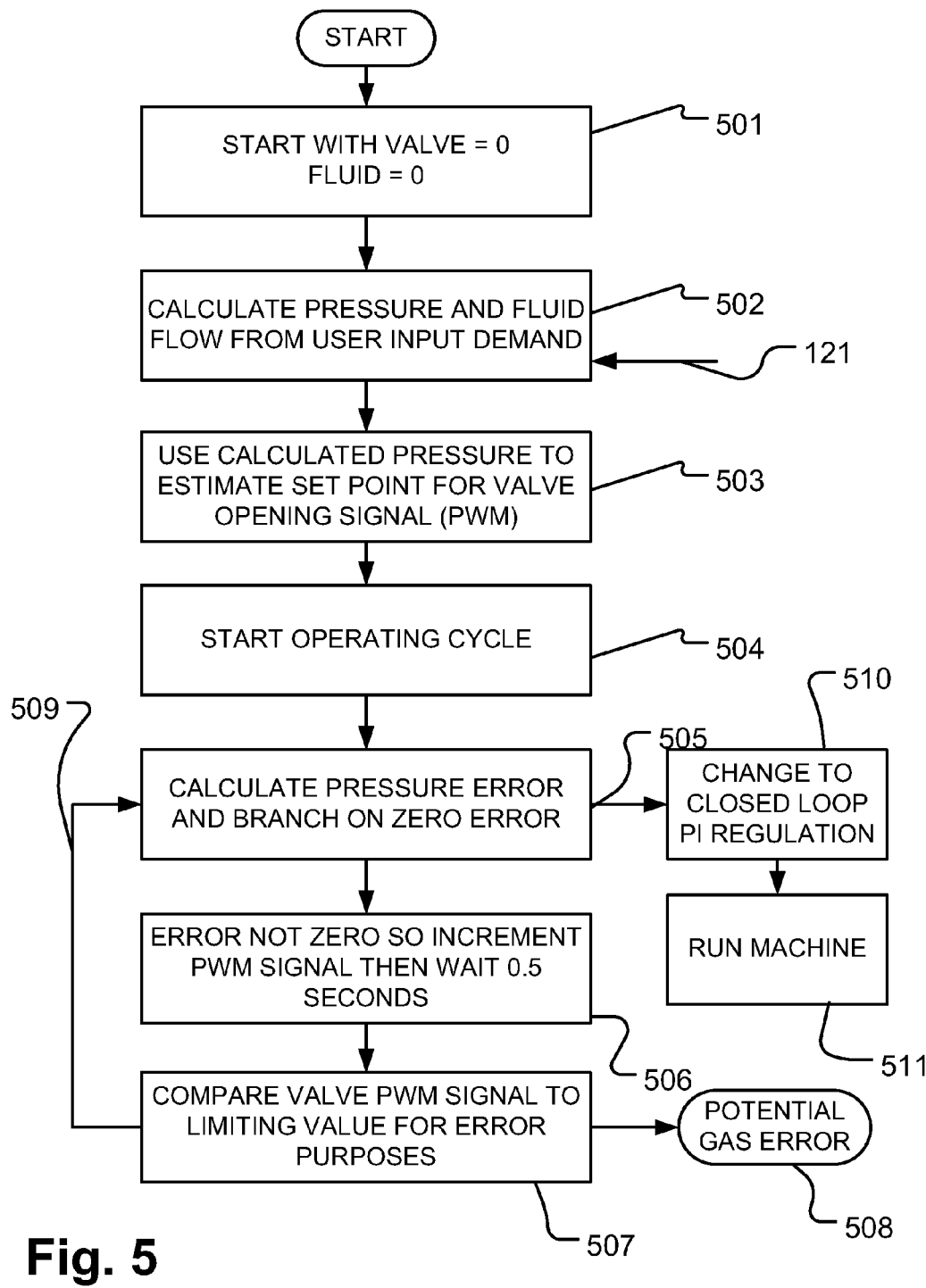
FIG. 5 is a flow chart showing an embodiment of the control of the smoke generator.

FIG. 5 is a flow chart showing an embodiment of the control of the smoke generator including a start-up of the generator in a way to safely open the valve gradually reducing the risk of over-pressurizing the system and increasing the safety of the system. The smoke generator is normally started with a zero smoke liquid flow and the valve 111 closed, 501. In the next step 502 the smoke liquid flow and a target pressure are determined and/or calculated based on an input 121 demand for the desired amount of smoke to be generated (a smoke density parameter). This determination may be performed by the use of stored look-up tables or alternatively from stored functional relationship between the different parameters.

The target pressure is then used to estimate a set point for the valve opening signal (PWM), 503, whereupon the operating cycle of the generator comprising the closed loop feedback control is initiated, 504. Firstly, the pressure error expressing the difference between the target pressure and the measured pressure is calculated, 505. Depending on the size of the error pressure, the control method may branch to either the closed loop regulation or a gradual step-wise regulation of the valve. In case the error is non-zero or larger than some threshold, the valve is regulated by incrementing the PWM signal and the system is allowed time to react for example 0.5 seconds or similar, 506. The valve PWM signal is then compared to a pre-set threshold, 507, which if exceeded indicate a potential error with the gas supply, 508, which may be reacted upon for example by warning signals or by preventing the generator to be started. If the valve signals are within the acceptable, 509, the closed loop regulation of the valve employing for example a standard PI or PID control is performed, 510 and the smoke generator is run, 511.

Figure 6:
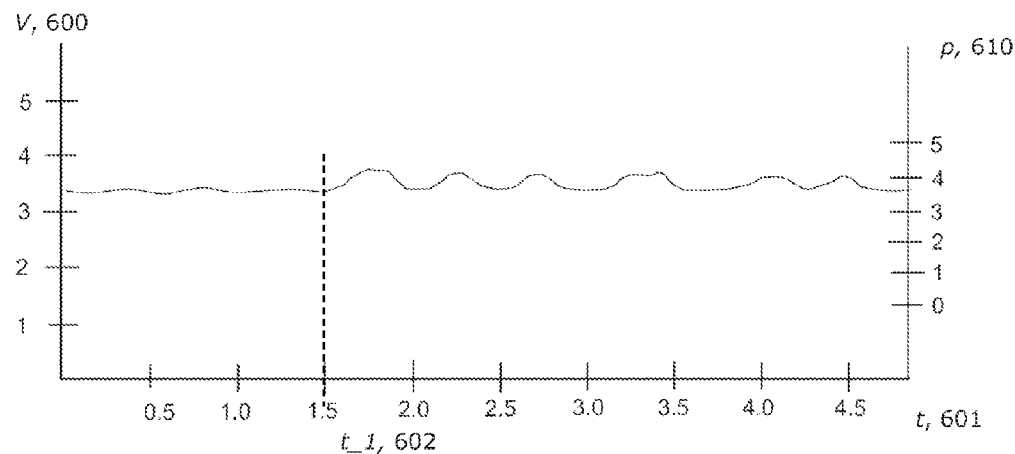
FIGS. 6 and 7 show the variation in pressure at the entry to the heat exchanger without and with pressure control according to the invention, respectively.
Figure 7:
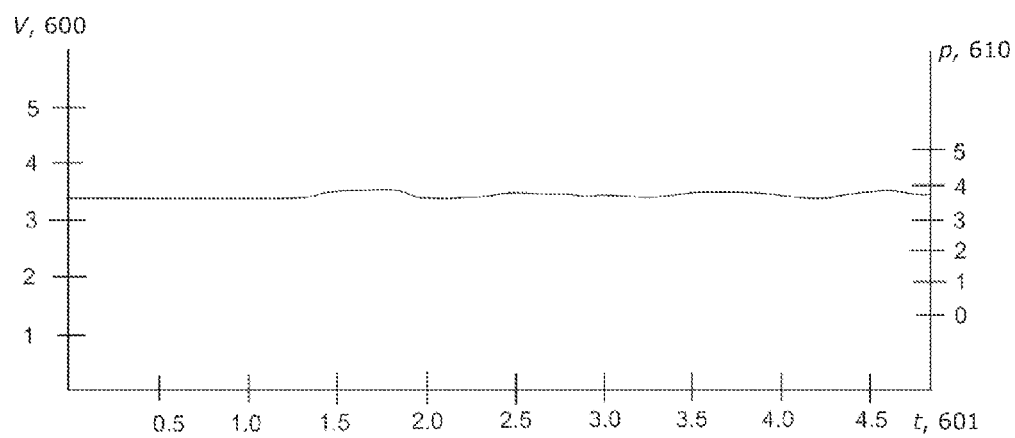

The curves shown in FIGS. 6 and 7 are oscilloscope traces documenting the effect of the pressure regulation according to the invention. The curves in FIGS. 6 and 7 show the variations in pressure at the entrance to the heat exchanger in a smoke generator according to the invention and for a time period without and with continuous control of the valve regulating the pressure of the gas supply, respectively.

The same smoke generator is used in the two experiments. The smoke generator uses a compressed carbon dioxide gas to propel a glycerine based smoke liquid through the heat exchanger in the machine. Gas flow control is achieved using a proportional valve which according to the invention is controlled by the pressure readings obtained from the pressure sensor mounted at the entry to the heat exchanger. The type of heat exchanger used comprises a two part "clamshell" construction with machined tracks forming a closed conduit in which vaporisation occurs. Such type of heat exchanger displays a very low back pressure when gas flows through, and therefore needs only a relatively low flow rate and driving pressure to give the smoke liquid used sufficient propulsion through the unit. The present smoke generator requires only a gas pressure at the entry to the heat exchanger in the order of 3-5 psi (or 0.2-0.35 bar) for normal operation. This has the result that the gas consumption can be reduced significantly when compared to higher pressure systems using conventional tube based heat exchangers which rely on pressure as high as 60 psi (4 bar) or higher to force the working fog fluid through the unit. In such high pressure systems, the variation in pressure at the heat exchanger caused by the process of boiling the fog fluid is relatively small when compared to the driving pressure.

However, for a low pressure system such as the machine used in the experiments, the pressure caused by the fluid vaporisation in the heat exchanger has a significant effect on the pressure at the entry to the heat exchanger, which can be as high as 20% of the working pressure. The fluid is delivered in small pulses by a dosing pump, which causes the pressure to vary in synchronism, and this can be very noticeable when running very small flows.

In FIGS. 6 and 7 is shown the sensor output in volts 600 measured at the mixing point at the entrance to the heat exchanger, and as a function of the time, 601. The voltage corresponds linearly to the pressure with a zero pressure voltage of 1.4V as shown on the other y-axis, 610, and with 1.75 psi per volt. The time scale is 500 ms per division. The curves of FIGS. 6 and 7 are plotted with the same values and subdivision of the axes. The measurements were performed with the smoke generator set to an output setting of 40%, and with the pump feeding the liquid giving a pulse every 700 ms. In the experiment shown in FIG. 6, the smoke generator was first run in its normal operation mode with the continuous control of the pressure valve based on the pressure measurements. At the time t_1, 602, the pressure regulation was then turned off and the smoke generation was performed without any regulation or control of the pressure for the remaining time plotted in FIG. 6. The experiment of FIG. 7 was conducted with a regulation of the pressure by controlling the valve in dependence of the measured gas pressure according to the invention.

Although the absolute sizes of the pressure variations are relatively small in both experiments being of the order of 0.8 psi and 0.3 psi, respectively, such variations are however enough to give a noticeable change in output in a system that requires only 3 to 5 psi for normal operation. As can be seen when comparing the curves of FIGS. 6 and 7, the pressure regulation according to the invention results in a significantly reduced variation in the pressure at the entrance to the heat exchanger. The more even and constant pressure obtained with the pressure regulation and as seen from FIG. 7, results in a correspondingly more even and consistent output of the hazer. In contrast the smoke generator as constructed without the addition of pressure control has a very significant pressure variation and a visual inspection of the produced haze yields a more uneven output of haze. This is important, since the effect then looks cloudy and yields a poor appearance in the light beams of a classic lightshow.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a smoke generator, wherein the smoke generator is adapted to be connected to a supply of a pressurized gas and to a supply of a smoke liquid, the generator comprising a valve to regulate the pressure of the gas, a fluid driver to regulate a flow of the smoke liquid, a pressure sensor to measure a gas pressure, a mixing unit arranged to mix the smoke liquid and the pressurized gas, and a heat exchanger to heat the mixture of the pressurized gas and the smoke liquid to vaporize the smoke liquid and form a smoke upon ejection into surrounding air, the method comprising:
receiving a smoke density parameter from a user, the smoke density parameter being indicative of an amount of smoke to be generated by the smoke generator;
predefining a target gas pressure, wherein the target gas pressure depends on a smoke liquid type and on the smoke density parameter;
predefining a pressure variation limit, wherein the pressure variation limit is defined in dependence on the target pressure;
regulating the flow of the smoke liquid as a function of the smoke density parameter;
measuring the gas pressure at a position between the valve and the heat exchanger; and
controlling the valve as a function of both the smoke density parameter and the gas pressure, and such as to obtain the pre-defined target gas pressure, and a variation of the gas pressure lower than the predefined pressure variation limit.

2. The method of claim 1, wherein controlling the valve is performed by at least one of a proportional-integral (PI) controller or a proportional-integral-derivative (PID) controller.

3. The method of claim 1, wherein measuring the gas pressure is performed before the smoke liquid is mixed with the gas.

4. The method of claim 1, wherein measuring the gas pressure is performed after the smoke liquid is mixed with the gas.

5. The method of claim 1, further comprising determining the flow of the smoke liquid and regulating the flow of the smoke liquid as a function of the smoke density parameter.

6. The method of claim 1, further comprising determining the flow of the smoke liquid, and controlling the valve as a function of the smoke density parameter, the flow of the smoke liquid, and the gas pressure.

7. The method of claim 1, wherein the valve is controlled to yield a measured gas pressure in the range of 1 to 10 pounds per square inch (psi).

8. The method of claim 1, wherein regulating the flow of the smoke liquid is performed by a dosage pump, and the flow of the smoke liquid is determined by the dosage pump.

9. The method of claim 1, further comprising determining a temperature of the heat exchanger, and controlling the valve as a function of the temperature of the heat exchanger.

10. The method of claim 1, wherein controlling the valve is performed based on a look-up table that includes target gas pressure values for a plurality of smoke density parameters.

* * * * *